US004001554B2

United States Statutory Invention Registration [19]

[11] Reg. Number: H1554

[45] Published: Jul. 2, 1996

Horton

[54] MAGNELL HARDNESS TESTER

[75] Inventor: Donald W. Horton, Havre de Grace, Md.

[73] Assignee: The United States of America as represented by the Secretary of the Army, Washington, D.C.

[21] Appl. No.: 949,200

[22] Filed: Sep. 22, 1992

[51] Int. Cl.[6] ..... G01N 3/40

[52] U.S. Cl. ..... 73/82; 73/11.01; 73/81

[58] Field of Search ..... 73/11.01, 81, 82

[56] References Cited

U.S. PATENT DOCUMENTS

| | | | |
|---|---|---|---|
| 2,956,432 | 10/1960 | Henrikson | 73/81 |
| 3,295,363 | 1/1967 | Delporte | 73/81 |
| 3,754,436 | 8/1973 | Saxton | 73/81 |
| 4,164,141 | 8/1979 | Sandor et al. | 73/81 |
| 4,196,616 | 4/1980 | Argabrite et al. | 73/81 |
| 5,062,293 | 11/1991 | Bakirov et al. | 73/81 |

*Primary Examiner*—Bernarr E. Gregory

*Attorney, Agent, or Firm*—Freda L. Krosnick; Muzio B. Roberto; Frank J. Dynda

[57] ABSTRACT

An apparatus and method for testing the hardness properties of metallic sheet materials, wherein electromagnets are employed to replace clamping means. Said apparatus comprises two electromagnets, and a test head which comprises a ball indenter means, a conventional hydraulic hand pump, a pop-off release valve and numerous gauges. A method of testing metallic sheet materials, and specifically armors, is set forth.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNELL HARDNESS TESTER

RIGHTS OF THE GOVERNMENT

The invention described herein may be manufactured, used and licensed by or for the U.S. Government without payment to me of any royalty thereon.

BACKGROUND OF THE INVENTION

It is often necessary to determine the physical properties and characteristics of materials prior to employing them for any specified purpose. The invention pertains to the field of hardness testing of metallic sheet materials. This is simply a measurement of the strength of a sheet material under compressive loading. Hardness is a characteristic property of interest when one wishes to employ a specific material for, for example, defensive purposes, i.e. in the art of defensive armor. This property may be measured by determining the resistance of a material to projectile penetration.

Several methods/scales of reference for hardness of materials have been developed over the years. The Rockwell and Brinell hardness scales are the most common scales presently applied.

The Department of the Army has been employing Brinell Hardness Testing as a means for determining the resistance of armor materials to projectile penetration. This hardness testing measurement is defined as the resistance which a material specimen elicits to permanent indentation caused by a penetrating device by which predetermined loads are applied. It is used to measure the strength and/or hardness of a material under compressive loading.

The current method (Brinell Hardness Testing) for testing materials requires the use of a clamping device for supporting the test specimen while a predetermined load is mechanically applied to a 10-mm ball. The applied force may be as great as 3,000 kg depending upon the thickness and strength of the specimen material being tested. The indentation caused by the applied force is then evaluated using a Brinell microscope to measure the diameter of the impression. This measurement is then converted to Brinell hardness using the ASTM E10-66 conversion chart—published by the American National Standards Institute in accordance with the American Society for Testing and Materials (ASTM).

It is important to note that in the conventional method described above, the specimen to be tested must be physically brought to the testing apparatus and clamped thereto prior to applying the thousands of kilogram force necessary to place an indentation on the specimen. Therefore, because the material to be evaluated must be physically brought to the testing apparatus, oftentimes a specimen of the material is cut to represent the entire material for evaluation. This can destroy the structure and purpose for which the material was employed—i.e., armor on a vehicle. Moreover, due to the clamping mechanism employed, the conventional hardness testing apparatus is only able to test the area of the specimen which is not under the clamping mechanism. Stated differently, one is unable to test the hardness of the area of the specimen which is used for the purposes of clamping the tester thereto. Consequently, the conventional tester can only test an area within, for instance, four inches of the edge of a specimen plate due to the physical constraints described.

The inefficiencies of this prior art method are two-fold. (1) The material to be tested must be either physically removed from the machine/vehicle/structure to which it is affixed or portions of it cut or removed in order for the measurement to be made. Aside from potentially destroying the purpose for which the material was employed, the dismantling may be inconvenient as well as time consuming and it may require the employ of additional manpower. (2) And, since a portion of the specimen is required to facilitate the clamping of the tester thereon, one is limited in the portion of the specimen which may be tested.

Attempts have been made to overcome some of these inefficiencies. U.S. Pat. No. 4,199,976, issued to John C. Edward, teaches a mobile hardness testing apparatus which employs an electromagnet for magnetically attaching the testing apparatus to cylindrical materials to be tested. A clamping assembly is, therefore, not required. The teaching of this patent is directed to the testing of pipes and pipe collars. This testing apparatus is provided with a shaft member having an unidentified penetrator attached thereto. The penetrator is hand operated.

Although this prior art reference does make an attempt to overcome the inefficiencies described above, nowhere does the reference teach the application of the testing apparatus to evaluate metallic sheet materials—or armor materials. It merely teaches the use of one electromagnet for magnetically attaching the testing apparatus to a pipe or pipe collar to be evaluated. The hardness of a pipe or pipe collar is very much less than the hardness of metallic sheet material for which the present invention is intended to evaluate. One would not consider the teaching of U.S. Pat. No. 4,199,976 to employ an electromagnet having the strength required herein. Moreover, based on this teaching, no motivation would be present for employing two electromagnets, as required by the Magnell Hardness Tester. The patent is silent to some of the critical elements employed herein to assist in overcoming the deficiencies described as well as to simplify the measurement process.

The present invention has been designed to overcome all of the inefficiencies described above, as well as permitting the hardness measurement of sheet materials to be performed using the invention. When employing the present invention, the material to be tested need not be physically removed from the structure to which it is affixed. The present invention may be used directly on, for example, flat vehicular surfaces. The Magnell Hardness Tester is portable. It does not require the presence or use of a permanent or stationary work table.

Moreover, the present invention, does not require the use of a clamping means. Therefore, the test area of a specimen is in no way restricted. And, the thickness of the test specimen, which in the prior art methods would need to be considered for clamping purposes, is not an issue herein. There is no upper limit as to the thickness of a test material which may be evaluated by the present invention.

The present invention overcomes the current deficiencies in the prior art, and serves to satisfy a long overdue need for an efficient hardness tester apparatus.

BRIEF SUMMARY OF THE INVENTION

The present invention, "Magnell Hardness Tester," has been developed to measure the hardness of metallic sheet materials in an efficient, timesaving manner without the use of clamping mechanisms. Mounting of the Tester is achieved using magnetic forces. Generally, the Tester employs two electromagnets between which a test head assembly is sandwiched.

The invention comprises two electromagnets for magnetically attaching the Hardness Tester to the metallic specimen to be evaluated. The Hardness Tester additionally is equipped with a conventional test head which comprises a hydraulically operated means for applying the predetermined load to the specimen through an indenter; and a 10-mm ball indenter. Said ball indenter is operated by the hydraulic loading means. The invention is additionally equipped with a conventional pop-off release valve which will be described below.

The present invention is employed in the following manner. The apparatus, as depicted in the Figures, is placed onto the metallic sheet material to be evaluated. The 10-mm ball indenter is situated over the area to be tested. Then the electromagnets are activated in a conventional fashion to magnetically attract the metallic sheet material to adhere thereto.

Once the electromagnets are activated, a hydraulic hand pump is engaged to force a 10-mm ball indenter against the metallic sheet material. Said hydraulic pump is set to force a specific load onto the metallic sheet material through the 10-mm ball indenter—i.e., a load of 3,000 kg. The Hardness Tester is equipped with a conventional pop-off valve which releases the load applied to the specimen once the predetermined load force has been obtained.

The Hardness Tester, after employed, leaves a hardness impression on the specimen sheet. The diameter of this impression is optically measured using, for instance, a Brinell-microscope. The Brinell-microscope is hand held. It rests against the specimen in such a manner that it is perpendicular to the impression thereon. It is equipped with a reticle, located on the eyepiece, which is capable of measuring the hardness impression to an accuracy level of 0.05 mm at a magnification of 20×. In the present invention, one need not exclusively employ the Brinell-microscope. Any microscope capable of facilitating the measuring of a diameter of an impression to within 0.05 mm may be employed herein.

The diameter measurement of the hardness impression is then converted to a Brinell Hardness Number using the ASTM E10-73, Table 1 conversion chart. One having ordinary skill in the art of hardness testing would certainly be familiar with this conventional conversion chart. These charts may be found in *The Annual Book of Standards.*

In the case of the testing of armor materials, once the conversion to Brinell Hardness is made, the measurement is then compared to military specifications (MIL-A-46100D and MIL-S-12560D MR) to determine whether the tested materials comply therewith. MIL-A-46100D outlines the compliance specification for high hard armor material (HHA); MIL-S-12560D MR outlines the compliance specification for rolled homogeneous armor (RHA).

The hardness tester within the scope of the present invention will permit the accurate hardness testing of various metallic sheet materials. The present invention, and use thereof, avoids the inadequacies present in the prior art devices available to accomplish hardness testing.

Accordingly, it is an object of the present invention to provide an efficient means for determining the physical properties and characteristics of metallic sheet materials.

It is an object of the present invention to provide an apparatus and means for evaluating the hardness of a material without the use of mechanical clamping means.

It is a further object of the present invention to provide a hardness tester which employs electromagnets as a substitute for the prior art clamping means.

It is still a further object of the invention to provide a portable means for testing the hardness of various materials without their removal from the vehicle employing them.

It is still a further object herein to provide an apparatus for determining the resistance of armor materials to projectile penetration.

A further object of the present invention is to provide a hardness measurement apparatus, wherein the thickness of the metallic sheet material to be tested is immaterial to the application of the apparatus thereon. The apparatus is not limited by the thickness of the specimen to be tested.

It is still a further object of the invention to provide a hardness tester that can be used to measure the hardness of metallic sheet materials without regard to the thickness or the location of said materials.

It is a further object of the present invention to provide a hardness tester which may be used to measure the hardness of materials which must comply with specific military specifications.

Still a further object of the invention is to provide a hardness measuring apparatus which employs a hydraulic means of applying a load onto the test material, as opposed to a mechanical means.

The means to achieve these and other objectives of the present invention will be apparent from the following detailed description of the invention, drawings and the claims.

DETAILED DESCRIPTION OF THE INVENTION

The Magnell Hardness Tester, of the present invention, is capable of measuring the hardness of metallic sheet materials without the use of clamping means. This apparatus is a portable, efficient means for accomplishing what the prior art Brinell Hardness Tester does without the drawbacks set forth above.

The present invention employs two electromagnets which are an efficient substitute for the prior art clamping means. The battery magnets which may be employed herein may be of the type manufactured by O. S. Walker, Inc. of Worcester, Mass. These electromagnets must be capable of overcoming the required force needed to make an indentation in the metallic test material. Two electromagnets, for example, are employed herein to overcome the forces needed—i.e. 3,000 kg.

The Magnell Hardness tester is equipped with two electromagnets, and a test head which comprises a ball indenter means, conventional hydraulic hand pump, a pop-off release valve, and gauges. Test heads such as the King$^R$ Brinell test head, manufactured by King Tester Corporation, King of Prussia, Pa., may be employed herein. Conventional gauges are used to provide the operator with access to various measurements, as well as to provide the operator with a means for setting the apparatus to the needed parameters in order to perform the testing.

Prior to employing the apparatus of the present invention, the surface of the test material must be prepared in the manner required by the prior art methods. The first stage of material preparation for the hardness test consists of grinding the surface with a coarse grinder or similar device. This stage of the preparation removes the scale and decarburization from the surface. No novelty resides in the preparation of the test surface. The preparation is performed in a conventional fashion.

Once the surface is ground, it is then polished in a conventional manner using a fine polishing wheel. This step in the preparation is to provide a reflective surface on the metallic sheet material to enhance the readability of the hardness impression once the Magnell Hardness Tester has been employed.

The metallic sheet material is now ready to be evaluated by the apparatus of the present invention.

The indenter means, a 10-mm ball for example, employed in the present invention (the invention herein need not be limited to a specific size of ball indenter means) is situated above the metallic sheet material to be evaluated. Once the indenter means is in position, the electromagnets employed by the invention are activated in a conventional manner. A specific load is forced upon the prepared surface using a conventional, hydraulic hand pump which forces the, for example, 10-mm ball indenter against the prepared metallic material. Said hydraulic hand pump may be set to deliver various load forces depending upon the material to be evaluated. For example purposes only, the description herein will use a hydraulic hand pump which has been set to deliver a load of 3,000 kg force.

Once 3,000 kg force has been exerted on the prepared surface of metallic material, a pop-off valve acts to release the load. The pop-off valve may be of the conventional type and is incorporated into the test head. The King$^R$ Brinell Test Head, for example, has incorporated therein a conventional pop-off valve. The force at which the pop-off valve releases may be mechanically set by the operator.

The resulting indentation or impression left on the metallic material is evaluated to determine the properties of said specimen. The diameter of the hardness impression may then be optically measured using a Brinell microscope, for example. This specific microscope, as previously described, is capable of measuring the impression left to 0.05 mm. This diameter measurement may then be converted to a Brinell Hardness Number by employing the ASTM E10-73, Table 1 conversion chart.

If one wishes to determine if a material meets the armor needs of the military, these Brinell Hardness Number values may be evaluated against the military specification requirements for the various armors—i.e. rolled homogeneous armor (MIL-A-12560D MR), high hard armor (MIL-A-46100D), or other specifications.

Other features of the present invention will be apparent from the following drawings and their descriptions.

DETAILED DESCRIPTION OF THE DRAWINGS

The drawings will be further discussed in order to provide a better understanding and description of the present invention.

Figure 1:
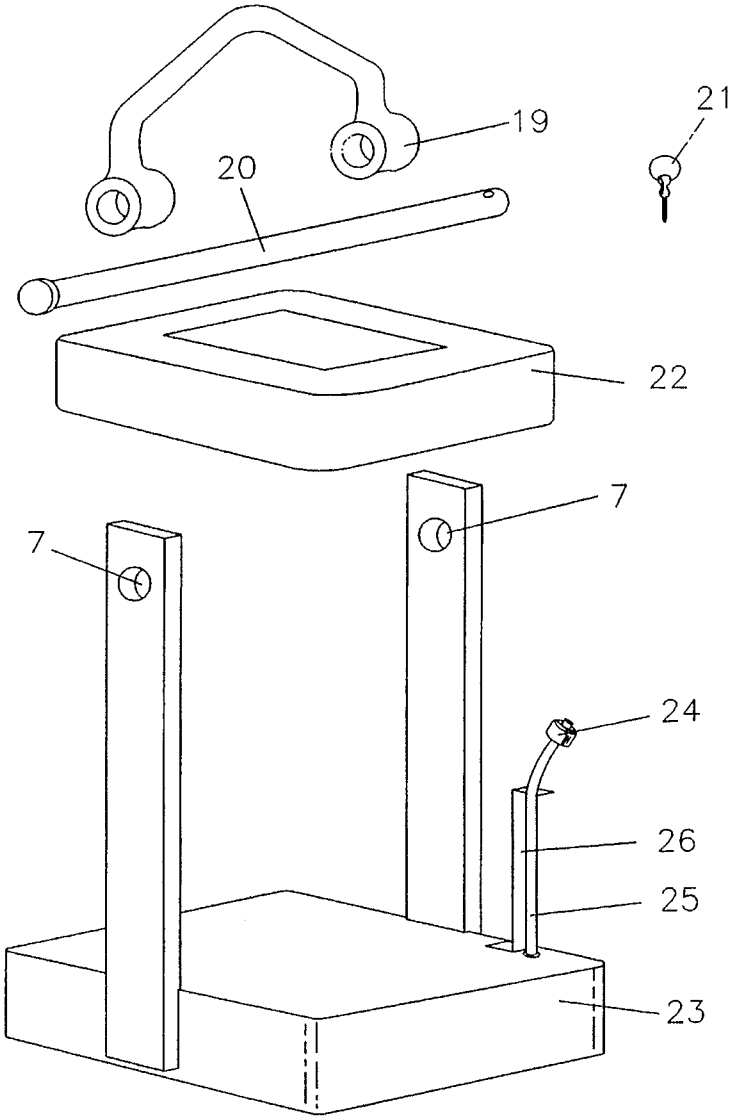
FIG. 1 is a schematic representation of the electromagnet set up employed in the present invention.

FIG. 1 illustrates a schematic representation of the electromagnet assembly configuration 51 employed in the Magnell Hardness Tester herein. The electromagnet housing or base 23 is equipped with magnet cord 25 having magnet plug 24. Said cord 25 is supported by cord support 26. The electromagnet base 23 is joined with a coil 12 V encapsulating kit 22, by means of longitudinal connectors 16. Said coil 12 V encapsulating kit 22 is the electromagnet. The encapsulating kit or electromagnet 22 comprises electromagnet coils which are contained in a conventional phenolic resin type medium to firmly hold the coils in a specific orientation. This type of encapsulating kit or electromagnet 22 is of the type conventionally employed in steel mills and shipyards for lifting steel plates, where rigging may not be required.

The present invention (not shown) employs two encapsulating kits or electromagnets 22 and two electromagnet bases or housings 23. Longitudinal connectors 16 are employed to join said kit 22 and electromagnet base 23 via ball bar 19, through which rod 20 engages longitudinal connectors 16 with said ball bar 19 through orifices 7. Electromagnet 22 fits into base 23. Snap pin 21 secures rod 0 in place, hence securing the structure. This configuration facilitates the employ of two electromagnet assemblies 51 which are used in a side-by-side configuration to support, for example, a Brinell test head (not shown) therebetween.

Figure 2:
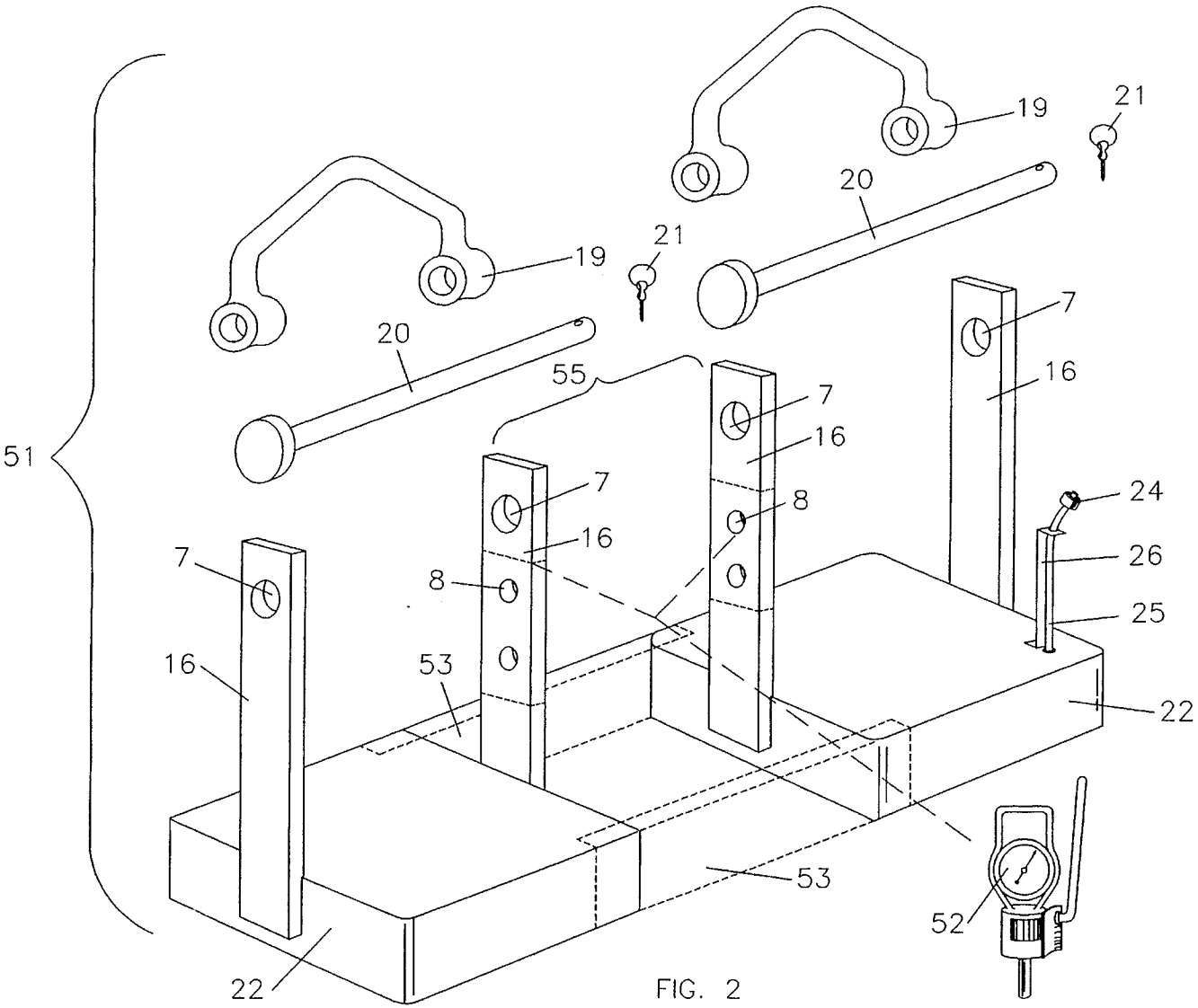
FIG. 2 is a schematic representation of the hardware developed to support the test head between the electromagnet set ups. It additionally illustrates schematically the entire testing apparatus within the scope of the invention.

FIG. 2 illustrates the hardware developed within the scope of the present invention to support, for example, the Brinell test head 52 between the two electromagnets 22. The electromagnets herein 22 are shown within their housing or base (See description in FIG. 1, above.) The Brinell test head 52 is positioned between electromagnets 22 via conventional affixing means, i.e. nuts and bolts (not shown), through the orifices 8 present in longitudinal connectors 16. Said test head 52 is sandwiched between the two electromagnet assemblies 51. The Magnell Hardness Tester, the entire apparatus set forth in FIG. 2, is composed of two electromagnet assemblies 51, which are rigidly secured to one another via conventional mechanical connectors 53. Said mechanical connectors 53 facilitate a space 55 to be present between said electromagnet assemblies 51 so as to permit the test head to be sandwiched therebetween. Said space 55 is to house the Brinell test head.

The electromagnets, as well as the hydraulic test head, which may be employed within the scope of the present invention are conventional in design. The invention does not reside in these individual component parts. Rather, the invention resides in the combination of these components in the manner described. The invention resides, as well, in the method of employing the Magnell Hardness Tester to determine the hardness of metallic sheet materials, such as armors.

The novelty of the Magnell Hardness Tester system is that it employs electromagnets in place of a clamping mechanism to overcome the required force (i.e. 3,000 kg) needed to conduct a hardness test. The electromagnets act as the sole means of holding the test sheet material to the test apparatus. They additionally are instrumental in applying the force to the sheet material. The present invention also employs a hydraulic means for applying a load to the test surface, as opposed to a mechanical means.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

I claim:

1. A method for testing the hardness properties of armor, wherein said testing is performed while said armor is physically affixed to a structure it is intended to protect, wherein said method comprises removing scale and decarburization from the surface of the physically affixed armor by grinding said surface using a coarse grinder;

polishing said surface to provide a reflective surface on said armor material;

employing an apparatus comprising two electromagnets and a test head assembly, wherein said test head assembly is sandwiched between said two electromagnets and is mechanically attached to said electromagnets, and wherein said test head assembly comprises a ball indenter means, a means for applying a load to said armor material and a pop-off release valve, in the following manner:

positioning said ball indenter means above said armor to be tested;

activating said two electromagnets;

forcing a predetermined load onto said armor by activating said means for applying a load to said armor, wherein said load is applied through said ball indenter;

optically measuring the diameter of the hardness impression left by said load; and converting said diameter to a hardness measurement.

2. A method for determining the resistance of armor materials to projectile penetration, wherein said method is performed while said armor is physically affixed to a structure which it is intended to protect, wherein said method comprises removing scale and decarburization from the surface of the physically affixed armor by grinding said surface using a coarse grinder;

polishing said surface to provide a reflective surface on said armor material;

employing an apparatus comprising two electromagnets and a test head assembly, wherein said test head assembly is sandwiched between said two electromagnets and is mechanically attached to said electromagnets, and wherein said test head assembly comprises a ball indenter means, a means for applying a load to said armor material and a pop-off release valve, in the following manner:

positioning said ball indenter means above said armor to be tested;

activating said two electromagnets;

forcing a predetermined load onto said armor by activating said means for applying a load to said armor, wherein said load is applied through said ball indenter;

optically measuring the diameter of the hardness impression left by said load; and converting said diameter to a hardness measurement.

* * * * *